Oct. 15, 1946. C. W. J. HEDBERG 2,409,563
AIR CLEANING PLANT
Filed Feb. 27, 1945 2 Sheets-Sheet 1

Inventor:
Carl W. J. Hedberg
Pierce + Scheffler
Attorneys.

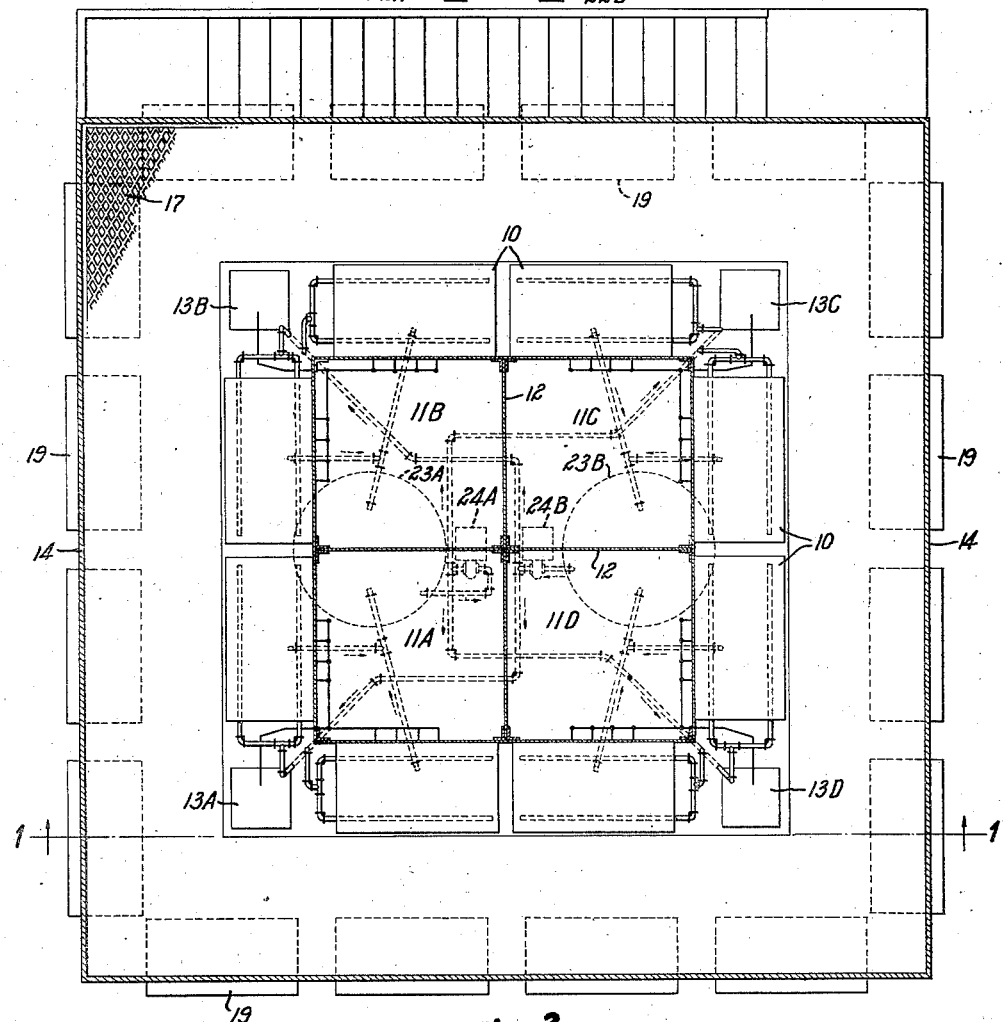

Patented Oct. 15, 1946

2,409,563

UNITED STATES PATENT OFFICE 2,409,563

AIR CLEANING PLANT

Carl W. J. Hedberg, Bound Brook, N. J., assignor to Research Corporation, New York, N. Y., a corporation of New York Application February 27, 1945, Serial No. 579,908

6 Claims. (Cl. 183—7)

This invention relates to air cleaners, and particularly to a plant for the cleaning of air by electrical precipitation.

An object of the invention is the provision of a plant capable of cleaning large volumes of air by electrical precipitation without interruption over long periods of time.

A further object of the invention is the provision of apparatus for supplying continuously large volumes of air for buildings, industrial operations, and the like.

In order to accomplish these and other purposes, the air cleaning plant of the invention comprises a vertical shaft, a plurality of electrical precipitators forming at least a portion of the vertical walls of the shaft, means closing one end, for example, the bottom end of the shaft, vertical partitions dividing the shaft into a plurality of vertical conduits each having at least one of the electrical precipitators in an external wall thereof, and means in each of the vertical conduits in an end thereof opposite the closed end for closing the conduit independently of the other of the conduits.

With such an arrangement air may be drawn through any one or more of the vertical conduits through the electrical precipitator or precipitators in the walls thereof, while one or more of the other of the conduits is shut off from the air outlet ducts, so that the electrical precipitator or precipitators in the shut-off conduits may be cleaned and, if need be, serviced without any interruption in the continuous flow of air through the system.

Two-stage air cleaning precipitators of the type described in application Serial No. 576,734 of Harry A. Wintermute, filed February 8, 1945, are advantageously used in the air cleaning plant of the invention and a plant embodying the precipitators of said application will be more particularly described herein for the purpose of illustrating the principles of the invention, but the plant of the invention may include any type of horizontal flow electrical precipitator which is adapted to remove effectively the suspended material contained in the air or other gas being cleaned.

For many purposes, it will be desirable to provide the collecting surfaces of the electrical precipitators with a film of relatively non-volatile, viscous composition, adapted to retain the precipitated material and which may be flushed off the collecting surfaces together with the accumulated precipitated material by means of a suitable flushing liquid as described in the Wintermute application. For this purpose, the air cleaning plant of the invention may include a flushing and electrode coating system, as described in detail herein, whereby the electrical precipitators associated with each of the vertical conduits of the plant may be independently flushed and coated.

The invention will be more particularly described with reference to the accompanying drawings showing a typical air cleaning plant embodying the principles of the invention.

In the drawings:

Fig. 2 is a horizontal section on line 2—2 of Fig. 1, and

Fig. 3 is a horizontal section on line 3—3 of Fig. 1.

Figure 1:
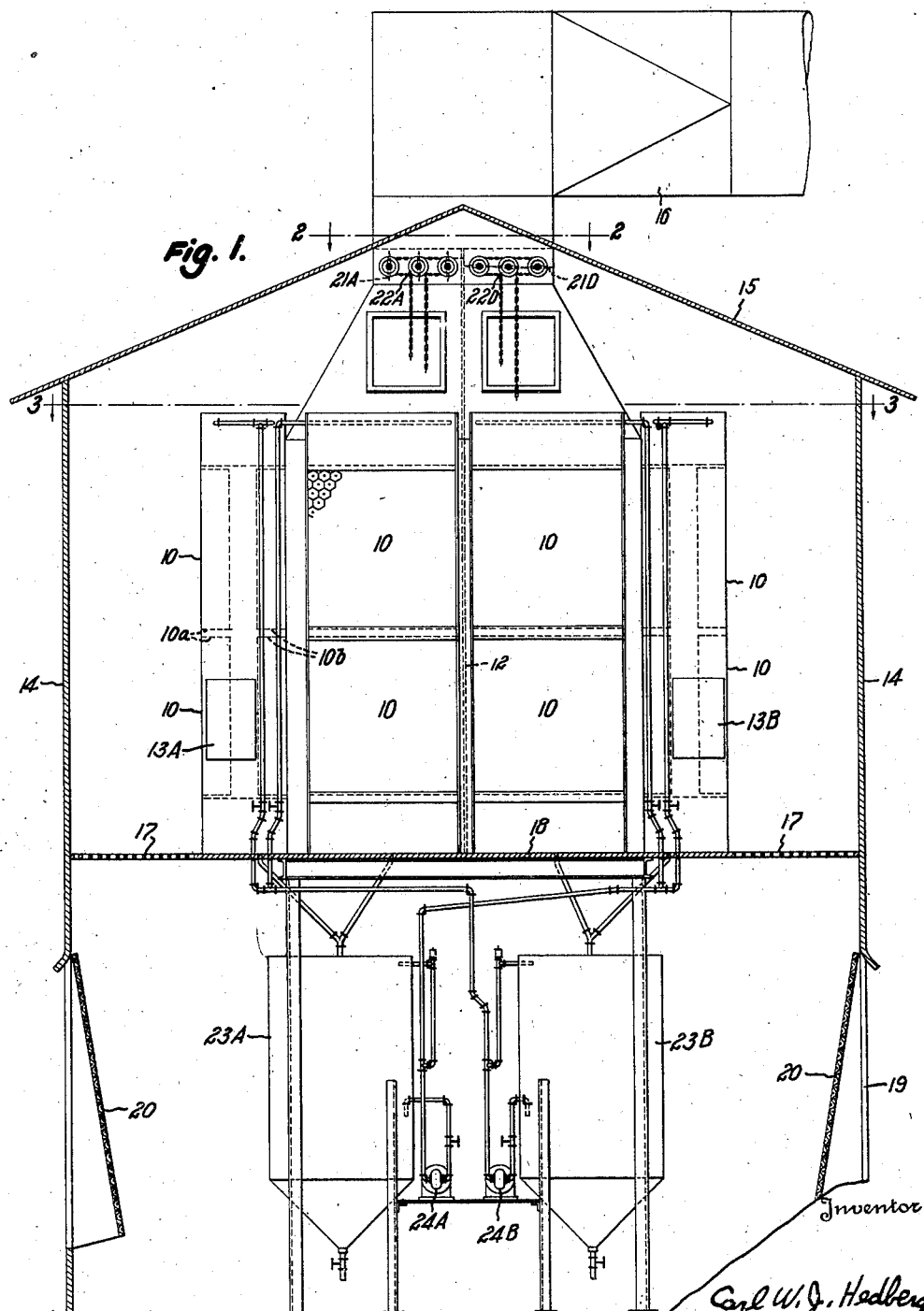
Fig. 1 is a vertical sectional elevation, on line 1—1 of Fig. 3, of an air cleaning plant of the invention.

In the air cleaning plant shown in the drawings, sixteen horizontal flow electrical precipitating units 10, each comprising an ionizing section 10a and a collecting section 10b, advantageously constructed in accordance with the principles of the Wintermute application, are arranged in groups, four each at the external vertical walls of the four vertical conduits 11A, 11B, 11C, 11D, into which the central vertical shaft is divided by partitions 12.

Four power supply systems 13A, 13B, 13C, 13D are provided to supply high tension electric current to the precipitators. Each of the power supply systems is connected to the four electrical precipitating units associated with each of the vertical conduits.

The air cleaning plant is advantageously housed in a protective structure comprising walls 14 spaced from the walls of the control shaft, a roof 15 through which the outlets of the vertical conduits 11A, 11B, 11C, 11D pass into communication with a cleaned air duct 16, and a grill floor 17 at the level of the bottom closure member 18 of the central shaft. In the walls of the housing below the grill floor 17 are provided inlet openings 19 in which are placed air filters 20 which may consist, for example, of blankets of glass wool, advantageously coated with a viscous liquid composition.

In the outlet ends of the vertical conduits 11A, 11B, 11C, 11D, above the precipitating units, dampers 21A, 21B, 21C, 21D are provided together with opening and closing mechanism 22A, 22B, 22C, 22D whereby the dampers in each outlet may be independently closed and opened.

For the purpose of providing for the supply of coating liquid to the collecting surfaces of the precipitating units, or for flushing the units, or for both purposes, a liquid supply and storage system is located in the lower portion of the housing. This system comprises a pair of storage and settling tanks 23A, 23B, pumps 24A, 24B and associated pipes and valves whereby liquid may be pumped from either of the tanks to the set of precipitating units associated with any one of the vertical conduits 11, and drained from said units into the other of the tanks.

In operation, air is drawn by means of suitable fan means, not shown, into the system through filters 20, up through grill 17, and successively through the ionizing sections 10a and the collecting sections 10b, of the energized precipitating units associated with the vertical conduits 11A-11D which are in communication with the clean air duct 16. In passing through the precipitating units suspended particles in the air stream are deposited on the collecting surfaces of the units and gradually accumulate until a substantial coating of collected particles is built up.

When a predetermined coating of collected material has accumulated, or preferably at regular intervals, the set of precipitating units which has been in operation longest is cut out of operation by closing the associated damper 21 and disconnecting the associated power supply unit 13 therefrom. Then flushing and coating liquid is pumped from that one of the settling and storage tanks 23 which has had the longest period of settling to the top of the set of precipitating units to be flushed and coated, the flushing liquid, with deposited material draining from the bottom of the precipitating units to the other of the tanks 23, leaving a coating of the liquid on the collecting surfaces of the units. The precipitating units may then be put back into operation by connecting the associated electrical supply system 13 and opening the associated dampers 21.

The following table shows illustrative operating sequences for a four-day period of precipitator operation:

*1st day.*—Flush precipitating units of conduit 11A with liquid from tank 23B, draining to tank 23A.

*2d day.*—Flush precipitating units of conduit 11B with liquid from tank 23A, draining to tank 23B.

*3d day.*—Flush precipitating units of conduit 11C with liquid from tank 23B, draining to tank 23A.

*4th day.*—Flush precipitating units of conduit 11D with liquid from tank 23A, draining to tank 23B.

The precipitating units may conveniently be flushed for about 10 minutes with, for example, 30 gallons of liquid per minute.

It will be seen that under the typical sequence of operations outlined above each set of precipitating units is flushed every four days and that the flushing liquid has about 24 hours of settling time in the tanks. Other periods of operation may, of course, be selected to fit varying conditions and a larger number of storage and settling tanks may, of course, be provided.

While the square arrangement with four vertical conduits and associated sets of precipitating units have been shown by way of example, other arrangements may obviously be provided and many variations in the apparatus may be made without departing from the principles of the invention as defined in the following claims.

I claim:

1. An air cleaner comprising a vertical shaft, a plurality of electrical precipitators forming at least a portion of the vertical walls of the shaft, means closing one end of the shaft, vertical partition members dividing said shaft into a plurality of vertical conduits each having at least one of said electrical precipitators in an external wall thereof, and means in each of said vertical conduits at the end thereof opposite the closed end for closing said conduit independently of the other of said conduits.

2. An air cleaner comprising a vertical shaft, a plurality of electrical precipitators forming at least a portion of the vertical walls of the shaft, means closing one end of the shaft, vertical partition members dividing said shaft into a plurality of vertical conduits each having at least one of said electrical precipitators in an external wall thereof, means for electrically energizing the electrical precipitators in the walls of one of said conduits independently of the other electrical precipitators, and means in each of said vertical conduits at the end thereof opposite the closed end for closing said conduit independently of the other of said conduits.

3. An air cleaner comprising a vertical shaft, a plurality of electrical precipitators having successive ionizing and collecting stages forming at least a portion of the vertical walls of the shaft, means closing one end of the shaft, vertical partition members dividing said shaft into a plurality of vertical conduits each having at least one of said electrical precipitators in an external wall thereof, and means in each of said vertical conduits at the end thereof opposite the closed end for closing said conduit independently of the other of said conduits.

4. An air cleaner comprising a vertical shaft, a plurality of horizontal flow electrical precipitators forming at least a portion of the vertical walls of the shaft, means closing one end of the shaft, vertical partition members dividing said shaft into a plurality of vertical conduits each having at least one of said electrical precipitators in an external wall thereof, and means in each of said vertical conduits at the end thereof opposite the closed end for closing said conduit independently of the other of said conduits.

5. An air cleaner comprising a vertical shaft, a plurality of electrical precipitators forming at least a portion of the vertical walls of the shaft, means closing one end of the shaft, vertical partition members dividing said shaft into a plurality of vertical conduits each having at least one of said electrical precipitators in an external wall thereof, means in each of said vertical conduits at the end thereof opposite the closed end for closing said conduit independently of the other of said conduits, and means for supplying liquid to the electrical precipitators in the walls of one of said conduits independently of the other electrical precipitators.

6. An air cleaner comprising a vertical shaft, a plurality of electrical precipitators forming at least a portion of the vertical walls of the shaft, means closing one end of the shaft, vertical partition members dividing said shaft into a plurality of vertical conduits each having at least one of said electrical precipitators in an external wall thereof, means in each of said vertical conduits at the end thereof opposite the closed end for closing said conduit independently of the other of said conduits, and means for supplying liquid to the electrical precipitators including at least two liquid containers, valved conduits including pumping means connecting said containers independently to the top and to the bottom of the electrical precipitators, whereby liquid may be conveyed from one of said tanks to the top of the electrical precipitators in the walls of one of said conduits and from the bottom of said electrical precipitators to another of the tanks, independently of the other electrical precipitators.

CARL W. J. HEDBERG.